United States Patent
Nelogal et al.

(10) Patent No.: US 12,353,568 B2
(45) Date of Patent: Jul. 8, 2025

(54) STORAGE DEVICE POWER CONTROL BY EXPANDER DEVICE BASED ON A DATA SECURITY POLICY

(71) Applicant: Dell Products L.P., Round Rock, TX (US)

(72) Inventors: Chandrashekar Nelogal, Round Rock, TX (US); Santosh Kumar Sarangi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 17/992,391

(22) Filed: Nov. 22, 2022

(65) Prior Publication Data

US 2024/0169073 A1   May 23, 2024

(51) Int. Cl.
G06F 21/60 (2013.01)
G06F 3/06 (2006.01)
G06F 21/78 (2013.01)
G06F 21/85 (2013.01)

(52) U.S. Cl.
CPC ............ *G06F 21/602* (2013.01); *G06F 3/062* (2013.01); *G06F 21/78* (2013.01); *G06F 21/85* (2013.01)

(58) Field of Classification Search
CPC ........ G06F 21/602; G06F 3/062; G06F 21/78; G06F 21/85
See application file for complete search history.

(56) References Cited

U.S. PATENT DOCUMENTS

| | | | |
|---|---|---|---|
| 2008/0209246 A1* | 8/2008 | Marks | H04L 12/12 713/323 |
| 2010/0257377 A1* | 10/2010 | Ejiri | G06F 12/1458 713/193 |
| 2012/0239943 A1* | 9/2012 | Okamoto | G06F 21/6218 713/193 |
| 2016/0330201 A1* | 11/2016 | Nguyen-Huu | H04L 9/0822 |
| 2021/0342280 A1* | 11/2021 | McDaniel | G06F 13/20 |
| 2021/0351948 A1 | 11/2021 | Lewis et al. | |

FOREIGN PATENT DOCUMENTS

WO   WO-2019180401 A1 *  9/2019  ......... G06F 12/0875

OTHER PUBLICATIONS

Meijer, Carlo, and Bernard Van Gastel. "Self-encrypting deception: weaknesses in the encryption of solid state drives." 2019 IEEE Symposium on Security and Privacy (SP). IEEE, 2019. (Year: 2019).*

* cited by examiner

*Primary Examiner* — Kenneth M Lo
*Assistant Examiner* — Hewy H Li
(74) *Attorney, Agent, or Firm* — Larson Newman, LLP

(57) ABSTRACT

A storage enclosure of an information handling system includes multiple storage drives, and an expander device. The storage drives include one or more self-encrypting drives (SEDs). The expander device determines whether a SED enables a power disable capability. In response to detection that the SED enables the power disable capability, the expander device monitors a link status between the information handling system and the storage enclosure. In response to a link status change being detected, the expander device waits a period of time and determines the link status after the period of time. If the link status is link down, the expander device implements a power cycle in the storage drives. After the power cycle of the storage drives, the expander device sets the drives to a locked state.

20 Claims, 3 Drawing Sheets

STORAGE DEVICE POWER CONTROL BY EXPANDER DEVICE BASED ON A DATA SECURITY POLICY

FIELD OF THE DISCLOSURE

This disclosure generally relates to information handling systems, and more particularly relates to storage device power control based on a data security policy.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A storage enclosure of an information handling system includes multiple storage drives, and an expander device. The storage drives include one or more self-encrypting drives (SEDs). The expander device may determine whether a SED enables a power disable capability. In response to detection that the SED enables the power disable capability, the expander device may monitor a link status between the information handling system and the storage enclosure. In response to a link status change being detected, the expander device may wait a period of time and determine the link status after the period of time. If the link status is a link-down state, the expander device may implement a power cycle in the storage drives. After the power cycle of the storage drives, the expander device may set the drives to locked state.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
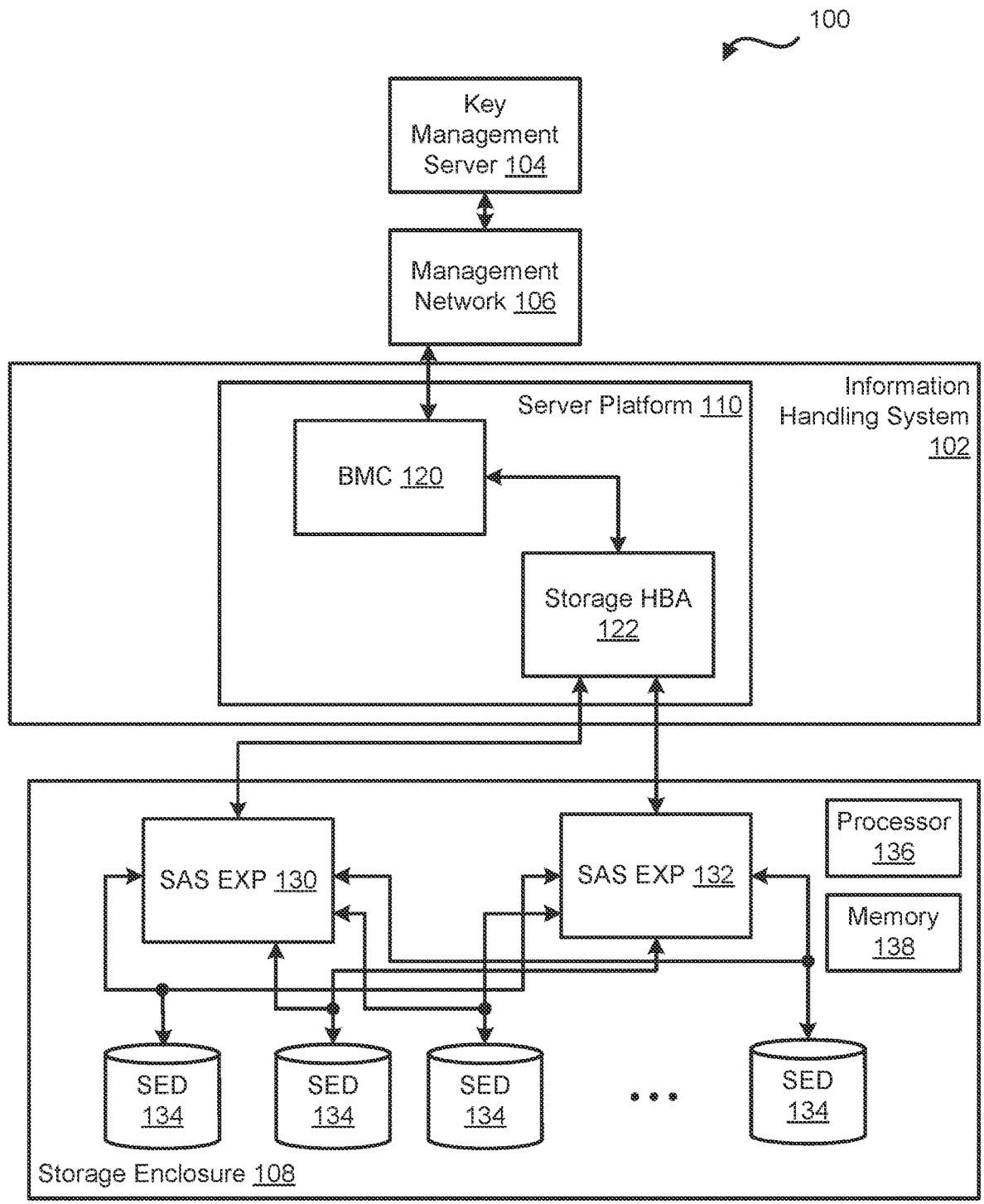
FIG. 1 is a block diagram of a portion of an information handling system according to an embodiment of the present disclosure.

FIG. 1 shows a system 100 including an information handling system 102 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

System 100 includes a key management server 104, a management network 106, and a storage enclosure 108. In an example, information handling system 102 may communicate with key management server 104 via management server 106. Information handling system 100 includes a server platform 110, which in turn includes a baseboard management controller (BMC) 120 and a storage host bus adaptor (HBA) 122. Storage HBA 122 will be referred to herein as a storage controller 122. Storage enclosure 108 includes serial attached small computer system interface (SCSI) (SAS) expander devices 130 and 132, and multiple self-encrypting drives (SEDs) 134. In certain examples, each of expander devices 130 and 132 may be physical hardware devices, such as integrated circuits or the like. Each of expander devices 130 and 132 may include a processor, a memory, or the like to perform operations described herein. In an example, storage enclosure 108 may be external to information handling system 102 as shown in FIG. 1. Information handling system 100 may include additional components without varying from the scope of this disclosure.

During operation of information handling system 100, storage controller 122 may communicate with SAS expander devices 130 and 132 via a SAS communication protocol. In an example, each of expander devices 130 and 132 may communicate with each of SEDs 134. In certain examples, server platform 110 may support SEKM (Secure External Key Management), such that the server platform may receive keys from key management server 104 via network 106. Based on BMC 120 receiving keys from key management server 104, the BMC may act as a conduit to provide the keys to storage controller 122. In an example, storage controller 122 may utilize the keys to unlock SEDs 134 in storage enclosure 108. In response to SEDs 134 being unlocked, the SEDs may remain unlocked for access by any controller connected to storage enclosure 108 until a power cycle is performed for the SEDs. In certain examples, server platform 110 of information handling system 102 may have local key management components in any suitable devices, such as BMC 120, storage controller 122, or the like.

In certain examples, storage enclosure 108 may include its own power domain that is separate from the power domain of information handling system 102, such that one may receive a power loss or power cycle while the other continues without power interruption. In an example, SEDs 134 may be automatically locked upon a power cycle or a power loss event of storage enclosure 108. In this example, SEDs 134 may be configured to automatically lock during a manufacturing configuration process or operation in a factory.

In previous information handling systems, during a shut down of a server or information handling system associated with the SEDs, the drives remain unlocked if the drives were previously unlocked. In these previous information handling systems, an individual may have unplugged a cable from storage controller and plug the cable into another device without the SEDs being placed in a locked state. At this point, any other host may connect to the storage enclosure with an HBA, a RAID controller, or the like and may gain access to the data stored in the SEDs even if the host is not authorized to access data. Additionally, in previous information handling systems, a SAS cable from the storage enclosure may be disconnected from an authorized host and may be connected to another host that may not be authorized to access user data on the drives in the storage enclosure. In this scenario, the unauthorized host may access data based on the cable connection change.

Information handling system 102 and storage enclosure 108 may be improved by defining a power cycle SED lock policy setting configured by an administrator of the storage enclosure. In an example, the policy may include tools that may be executed on server platform 110 of information handling system 102 and be communicated to a processor 136 on storage enclosure 108 or processors within expander devices 130 and 132. In certain examples, the policy may be a selectable policy configured during setup operations of storage enclosure 108.

During setup or boot operations of storage enclosure 108, expander devices 130 and 132 may communicate with SEDs 134 and discover that the SEDs have power-disable capabilities. For example, each of SEDs 134 may provide/transmit that the drive includes/supports the power-disable capability in SAS identify address frame data. In response to discovery of the power-disable capabilities of SEDs 134, expander devices 130 and 132 may perform one or more operations to enable this functionality for the SEDs. In an example, expander devices 130 and 132 may report the power-disable capabilities of SEDs 134 for the corresponding PHY information in a SAS management protocol (SMP) discovery response to storage controller 122 of server platform 110.

In certain examples, expander devices 130 and 132 may perform one or more operations to discover capabilities of SEDs 134. For example, expander devices 130 and 132 may receive a different identify address frame from each SED 134 and may determine a state of a power-disable capable (PWR_DIS CAPABLE) bit in the identify address frame. If the power-disable capable bit is set to a first state, expander devices 130 and 132 may determine that the associated SED 134 supports the power-disable capability. In an example, the associated SED 134 may be determined based on the SED connected to a PHY cable which provided the identify address frame. In certain examples, the first state of the power-disable capable bit may be either a high digital value or a low digital value without varying from the scope of this disclosure.

In different examples, the selectable policy may have a default of not being enabled, or a default of being enabled without varying from the scope of this disclosure. In an example, the policy setting may enable or cause processors in expander devices 130 and 132 to power cycle SEDs 134 after a detection of a cable loss or link loss between storage enclosure 108 and storage controller 122 of information handling system 102. The policy setting may also include a grace period of time that expander devices 130 and 132 may wait for the link between storage controller 122 and storage enclosure 108 to come up again before the power cycle of SEDs 134 is performed. The grace period may be any suitable amount of time, such as 2 seconds, 3 seconds, or the like.

In an example, the policy may be implemented as an element in an SES control page, such as SES control page 02h. In this example, the policy may be created as a new element that defines the power control policy for SEDs 134. In certain examples, if the policy is enabled, then expander devices 130 and 132 may power cycle SEDs 134 after expiration of a timer started at detection that the host SAS link has experienced a loss.

In an example, BMC 120 in server platform 110 may be SES aware, such that the BMC may set the policy on storage enclosure 108 by setting the policy value in the SES element. In certain examples, the policy may be stored persistently within memory 138 of storage enclosure 108, within memories of expander devices 130 and 132, or the like. In another example, the policy may also be defined as a volatile element. In an example, the policy may also be cleared by BMC 120. SES interactions are known in the art and therefore are not covered in this disclosure except to describe aspects of this disclosure.

Information handling system 102 and storage enclosure 108 may be improved by processor 136 or processors in expander devices 130 and 132 being able to identify a scenario where in a host, such as storage controller 122, gets disconnected from expander devices 130 and 132. In response to this detection, expander devices 130 and 132 may wait for the defined grace period and then power cycle SEDs 134 if the link is still down. In an example, the power cycle may place SEDs 134 in a locked state. In an example, storage controller 122 may be disconnected due to a shutdown of server platform 110, due to a physical cable disconnect, or the like.

In an example, upon expander devices 130 and 132 determining that one or more of SEDs 134 have the power-disable capability, the expander devices may monitor the cable connection status between storage controller 122 and storage enclosure 108. In an example, expander devices 130 and 132 may monitor a host link status on the SAS cables between storage controller 122 and storage enclosure 108. In certain examples, expander devices 130 and 132 may determine whether the host link status has changed. In response to a detection that the host link status has changed, expander devices 130 and 132 may determine whether only one host connection has been lost or both host connections have been lost. In an example, expander devices 130 and 132 may ensure that both host connections have been lost before the power cycle policy is implemented. In another example, the power cycle policy may be implemented when only one of the two connections or links has been lost.

In certain examples, some conditions within server platform 110 may cause the host connection to drop for a predetermined amount of time. For example, a condition in server platform 110 may be a host controller reset, such as an online reset due to error recovery or due to a firmware update and activation, may cause the SAS link to bounce. In this example, an OS of information handling system 102 may continue to execute during the short loss of storage controller 122, and the OS may have one or more access operations for SEDs 134 to be executed when the storage controller is up and running again. Based on the continued execution expander devices 130 and 132 may implement debounce logic to ensure that these conditions have not occurred. Implementing the debounce logic in expander devices 130 and 132 may avoid the expander devices from locking up SEDs 134 in such conditions.

In an example, the debounce logic may be any suitable operations to verify that the SAS link cable is lost and not being affected by a host controller, such as storage controller 122, reset. For example, in response to a link status change, expander devices 130 and 132 may set a timer. Based on an expiration of the timer, expander devices 130 and 132 may reevaluate the host link status. If the host link status is still a link down, expander devices 130 and 132 may implement the power cycle policy, such that SEDs 134 are power cycled and the SEDs may be placed in a locked state. However, if the host link status is a link up, expander devices 130 and 132 may not implement the power cycle policy.

In certain examples, expander devices 130 and 132 may execute a SMP function, such as PHY_CONTROL, to trigger power disable and then reenable the power to the associated device, such as SED 134. In an example, expander devices 130 and 132 may self-initiate the SMP PHY_CONTROL function with a PWR_DIS CONTROL value set to a particular value followed by another value. For example, in a non-limiting embodiment, the PWR_DIS CONTROL value make be set to 11b followed by 10b. In this embodiment, the first value, 11b, may be associated with asserting power disable to the associated PHY followed the second value, 10b, being associated with a negating power disable.

In an example, expander devices 130 and 132 may utilize different protocols to implement the operations disclosed herein. For example, expander devices 130 and 132 may utilize SCSI enclosure service (SES), SMP, or the like. In certain examples, expander devices 130 and 132 may define a new SES element to support the power disable policy. The SES element may include a descriptor added to a configuration diagnostic page, and an element definition added to both the enclosure control and enclosure status diagnostic pages 02h. In certain examples, the configuration diagnostic page of the SES element may be page 01h, and the enclosure control and enclosure status diagnostic pages may be pages 02h. In an example, the policy settings may be "enable device power cycle upon host disconnect". When the value is enabled, storage enclosure 108, via firmware logic in expander devices 130 and 132, may implement the operations disclosed herein. In certain examples, this new SES element may be a standardized element in the expander devices 130 and 132, a vendor defined element, or the like.

In certain examples, expander devices 130 and 132 may define another parameter to specify the time out period to wait after a link down is detected. In an example, this time out period may be an amount of time expander devices 130 and 132 may wait before executing power cycle to SEDs 134. The time out period element may be combined with the policy element, be an independent element, or the like.

In an example, expander devices 130 and 132 may implement different functions or commands to disable and then re-enable power to SEDs 134 to cover all devices in storage enclosure 108. For example, expander devices 130 and 132 may implement a SMP initiator function and issue a SMP Phy Control command to a SMP target implementation. The SMP initiator function and the SMP Phy control command may be both located within the same expander device code. In an example, expander devices 130 and 132 do not have inventory as to which devices in storage enclosure 108 is an SED 134 and which is a non-SED. In this example, the policies in expander devices 130 and 132 may be applied to all drives located with storage enclosure 108.

In certain examples, firmware logic of expander devices 130 and 132 may perform the power cycle enable and disable without having to execute the SMP command and response. For example, the firmware logic of expander devices 130 and 132 may implement the power cycle logic as an action based on the policy and timer as a firmware implementation.

In an example, the power cycle of connected SAS target devices may be performed in any suitable manner. For example, at the physical signal level, expander devices 130 and 132 may implement the power cycle by asserting a POWER DISABLE signal, holding POWER DISABLE signal down for the necessary signal assert time and then de-asserting the POWER DISABLE signal for each connected SAS target device, such as SEDs 134.

Figure 2:
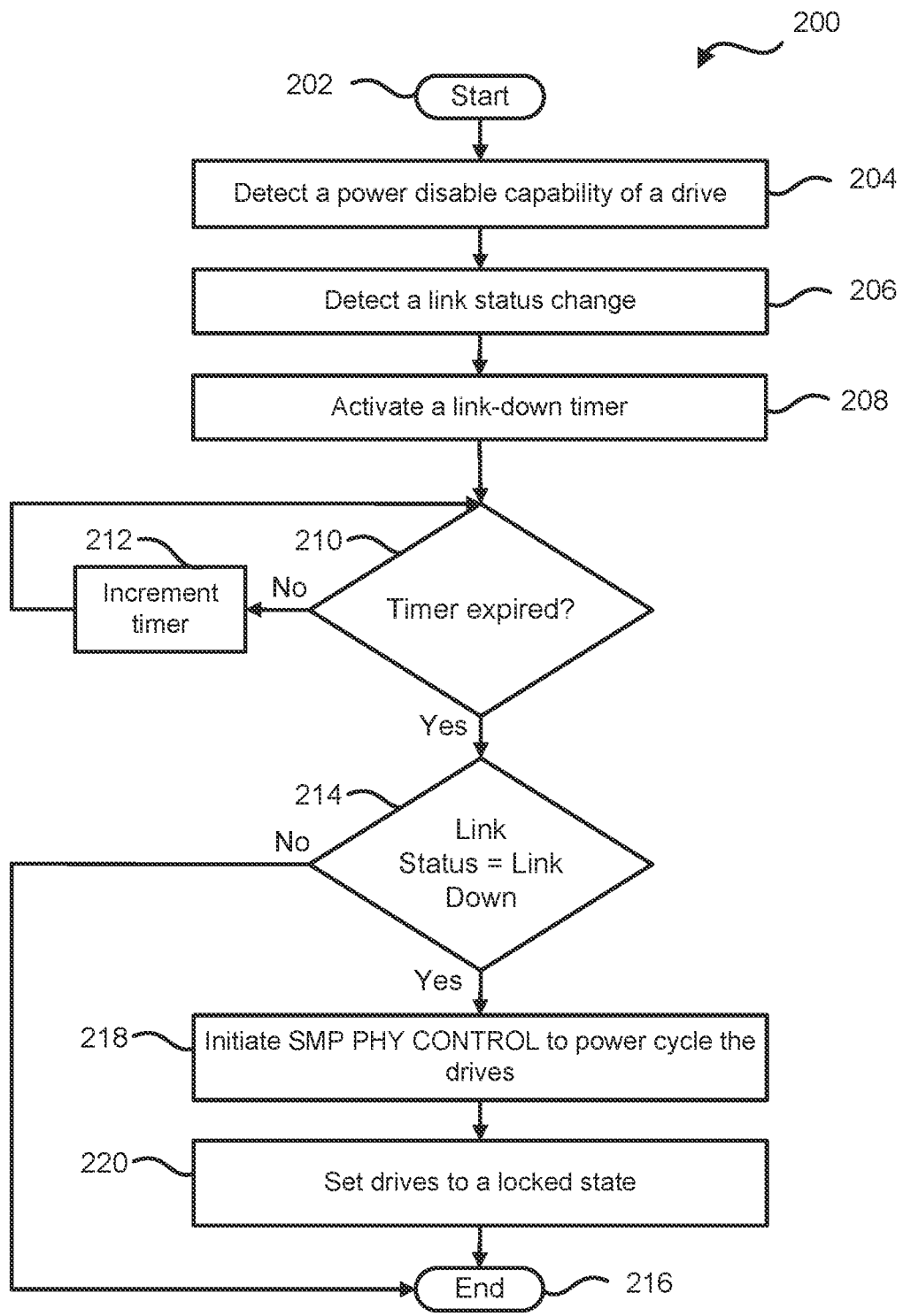
FIG. 2 is a flow diagram of a method for controlling a locked state of storage drives in an external enclosure according to an embodiment of the present disclosure.

FIG. 2 illustrates a flow diagram of a method 200 for controlling a locked state of storage drives in an external enclosure according to at least one embodiment of the present disclosure, starting at block 202. In an example, the method 200 may be performed by any suitable component including, but not limited to, expander devices 130 and 132 of FIG. 1. Not every method step set forth in this flow diagram is always necessary, and certain steps of the methods may be combined, performed simultaneously, in a different order, or perhaps omitted, without varying from the scope of the disclosure.

At block 204, a power disable capability of a drive is detected. In an example, the power disable capability may be detected via a SAS identify address frame (IAF) response frame received by an expander device from a SED. At block 206, a link status change is detected. In an example, the link status may be associated with a host connecting Phy. In certain examples, the link status change may be a change from a link up status to a link down status. At block 208, a link-down timer is activated. In an example, expander devices within a storage enclosure may define a time out period the link-down timer. The time out period may be any amount of time for the expander devices to wait after a link down is detected and before executing a power cycle to SEDs within the storage enclosure.

At block 210, a determination is made whether the timer has expired. If the timer has not expired, the timer is incremented at block 212. If the timer has expired, a determination is made whether the link status is equal to a link down at block 214. If the link status is not equal to the link down, the flow ends at block 216. If the link status is equal to the link down, a SMP PHY CONTROL is initiated to power cycle the drives at block 218. At block 220, the drives are set to a locked state and the flow ends at block 216.

Figure 3:
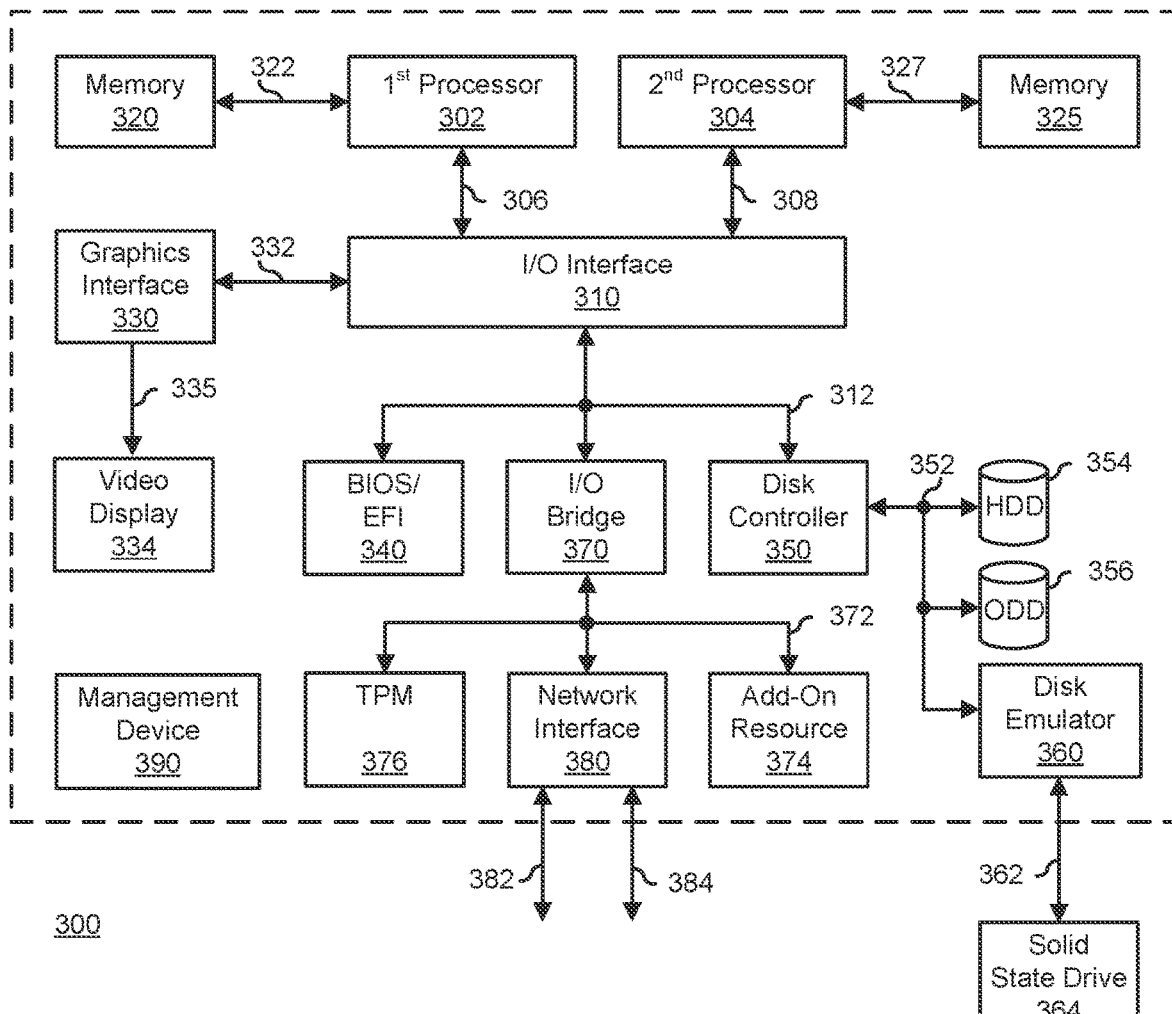
FIG. 3 is a block diagram of a general information handling system according to an embodiment of the present disclosure.

FIG. 3 shows a generalized embodiment of an information handling system 300 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332 and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 3394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312 or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A storage enclosure of an information handling system, the storage enclosure comprising:
   a plurality of storage drives including one or more self-encrypting drives (SEDs), the one or more SEDs including a first SED; and
   a first expander device to communicate with the storage drives, the first expander device to:
   determine whether the first SED enables a power disable capability;
   in response to a detection that the first SED enables the power disable capability, monitor a first link status of a first communication link between the information handling system and the storage enclosure;
   in response to a link status change being detected, wait a period of time and determine the first link status of the first communication link after the period of time;

if the first link status is link down, implement a power cycle in the storage drives; and after the power cycle of the storage drives, set the drives to a locked state.

2. The storage enclosure of claim 1, further comprises: a second expander device to monitor a second link status of a second communication link between the information handling system and the storage enclosure.

3. The storage enclosure of claim 2, wherein prior to the period of time being waited, the first expander device activates a link down timer.

4. The storage enclosure of claim 3, wherein prior to the link down timer being activated, the first and second expander devices to verify that both the first and second communication links are down.

5. The storage enclosure of claim 1, wherein determining whether the first SED enables the power disable capability comprises monitoring, by the first expander device, to monitor a serial attached small computer system interface identify address response frame.

6. The storage enclosure of claim 1, wherein the power cycle of the storage drives comprises: providing, by the first expander device, further to: provide a first command to disable power to the storage drives and a second command to re-enable power to the storage drives.

7. The storage enclosure of claim 6, wherein the first and second commands are serial attached small computer system interface management protocol Phy control commands.

8. The storage enclosure of claim 1, wherein the first link status change is the first link changing from a link up status to a link down status.

9. A method comprising:
   determining, by an expander device of a storage enclosure of an information handling system, whether a first self-encrypting drive (SED) enables a power disable capability, wherein the first SED is one of a plurality of SEDs in the storage enclosure;
   in response to a detection that the first SED enables the power disable capability, monitoring a first link status of a first communication link between the information handling system and the storage enclosure;
   in response to a link status change being detected, waiting a period of time and determining the first link status of the first communication link after the period of time;
   if the first link status is link down, implementing, by the first expander device, a power cycle in the storage drives; and
   after the power cycle of the storage drives, setting the drives to a locked state.

10. The method of claim 9, further comprising monitoring, by a second expander device, a second link status of a second communication link between the information handling system and the storage enclosure.

11. The method of claim 10 wherein prior to the period of time being waited, the method further comprises activating a link down timer.

12. The method of claim 11, wherein prior to the link down timer being activated, verifying that both the first and second communication links are down.

13. The method of claim 9, wherein determining whether the first SED enables the power disable capability comprises monitoring, by the first expander device, the method further comprises: monitoring a serial attached small computer system interface identify address response frame.

14. The method of claim 9, wherein the power cycle of the storage drives comprises providing, the method further comprises: providing a first command to disable power to the storage drives and a second command to re-enable power to the storage drives.

15. The method of claim 14, wherein the first and second commands are serial attached small computer system interface management protocol Phy control commands.

16. The method of claim 9, wherein the first link status change is the first link changing from a link up status to a link down status.

17. A system comprising:
   an information handling system including a storage controller; and
   a storage enclosure including:
      a plurality of storage drives including one or more self-encrypting drives (SEDs) including a first SED; and
      a first expander device to:
         if the first SED enables a power disable capability, then monitor a first link status of a first communication link between the information handling system and the storage enclosure;
         if a link status change is detected, then wait a period of time and determine the first link status of the first communication link after the period of time;
         if the first link status is link down, then implement a power cycle in the storage drives; and
         after the power cycle of the storage drives, set the drives to a locked state.

18. The system of claim 17, wherein the storage enclosure further comprises: a second expander device to monitor a second link status of a second communication link between the information handling system and the storage enclosure.

19. The system of claim 18, wherein prior to the period of time being waited, the first expander device to activate a link down timer.

20. The system of claim 19, wherein prior to the link down timer being activated, the first and second expander devices to verify that both the first and second communication links are down.

* * * * *